(12) United States Patent
Cuculo et al.

(10) Patent No.: US 6,827,773 B2
(45) Date of Patent: Dec. 7, 2004

(54) CELLULOSE SOLVENT COMPOSITIONS AND METHODS OF MAKING AND EMPLOYING SAME

(75) Inventors: John A. Cuculo, Raleigh, NC (US); Kazuyuki Hattori, Kitami (JP)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 10/283,505

(22) Filed: Oct. 30, 2002

(65) Prior Publication Data

US 2003/0136304 A1 Jul. 24, 2003

Related U.S. Application Data

(60) Provisional application No. 60/335,562, filed on Oct. 31, 2001.

(51) Int. Cl.[7] ............................. C08L 1/02; C08K 13/02; C08K 5/17
(52) U.S. Cl. ............................. 106/200.2; 106/204.01; 106/311; 536/56; 536/57
(58) Field of Search ..................... 106/200.2, 204.01, 106/311; 536/56, 57

(56) References Cited

U.S. PATENT DOCUMENTS 1,943,176 A * 1/1934 Graenacher ............... 106/200.2
4,367,191 A * 1/1983 Cuculo et al. ............... 264/187

FOREIGN PATENT DOCUMENTS

SU        1382884 A1 * 3/1988

* cited by examiner

*Primary Examiner*—David Brunsman
(74) *Attorney, Agent, or Firm*—Jenkins, Wilson & Taylor, P.A.

(57) ABSTRACT

Cellulose solvents, cellulose compositions, and methods of making and using the same. For example, a cellulose composition including cellulose dissolved in the following solvent: an amine-based composition, provided however, the amine-based composition is not ammonia; and a salt selected from the group including a thiocyanate salt, a halide salt, and a nitrate salt. Representative amine-based compositions include hydrazine, hydrazine hydrate, and ethylenediamine.

33 Claims, 4 Drawing Sheets

CELLULOSE SOLVENT COMPOSITIONS AND METHODS OF MAKING AND EMPLOYING SAME

CROSS REFERENCE TO RELATED APPLICATIONS

The present patent application is based on and claims priority to U.S. Provisional Application Ser. No. 60/335,562, entitled "THE HYDRAZINE/SODIUM THIOCYANATE CELLULOSE SOLVENT SYSTEM; SOLUBILITY OF CELLULOSE IN THE HYDRAZINE HYDRATE/ SODIUM THIOCYANATE SOLVENT SYSTEM; SOLUBILITY OF CELLULOSE IN THE ETHYLENEDIAMINE/SODIUM THIOCYANATE SOLVENT SYSTEM", which was filed Oct. 31, 2001 and is incorporated herein by reference in its entirety.

FIELD OF THE INVENTION

The present invention generally relates to a solvent system for cellulose. More particularly, the present invention provides an amine-based solvent for cellulose, a cellulose composition comprising the same (e.g. a cellulose solution), and methods of making and employing the solvent and cellulose composition (e.g. a cellulose solution).

Table of Abbreviations

| | |
|---|---|
| Cell | cellulose |
| DP | degree of polymerization |
| h | hour(s) |
| min | minute(s) |
| NMMO | N-methylmorpholine-N-oxide |
| w/v | weight to volume |
| w/w | weight to weight |
| wt % | percent by weight |

BACKGROUND ART

The dissolution of cellulose without chemical modification and/or derivatization is an extremely difficult task because it is a stiff molecule and it is characterized by close chain packing via numerous inter- and intramolecular hydrogen bonds. Since the 1970s novel solvents for cellulose based on the concept of "no heavy metals" have been sought to replace the multistep, polluting viscose process. Several relevant reviews that address current efforts to provide celluose solvents are as follows: Hudson, S. M. and Cuculo, J. A., *J Macromol Sci-Rev Macromol Chem* (1980) C18 (1):1–82; Philip, B., *J Macromol Sci-Pure and Apply Chem* (1993) A30:703–714; Guo, J.-X. and Gray, D. G., in *Cellulosic Polymers, Blends and Composites*; Gilbert, R. D., Ed.; Hanser: Munich, Vienna, New York (1994), Chapter 2, pp 25–45; Cuculo, J. A., et al., in *Polymeric Materials Encyclopedia*, Salamone, J. C., Ed., CRC Press: New York (1996) Vol. 2, pp 1029–1035; Myasoedova, V. V., in *Physical Chemistry of Non-aqueous Solutions of Cellulose and its Derivatives*, Myasoedova, V. V., Ed.; Wiley: Chichester, (2000), Chapter 1, pp 3–36.

Currently, only the N-methylmorpholine-N-oxide (NMMO)/$H_2O$ system developed by Chanzy et al. (Chanzy, H., et al., *J Polym Sci: Polym Lett Ed* (1979) 17:219–226) has been industrialized for the solvent spinning of cellulose. The product spun by this process is sold under the registered trademarks TENCEL® and COURTAULDS LYOCELL® by Courtaulds Fibres (Holdings) Limited, London, England, United Kingdom. The advantage of this solvent is its ability to attain exceedingly high concentrations of cellulose (e.g. 35% w/w in DP600) and anisotropic solutions, first reported on non-derivatized cellulose. See Chanzy, H. and Peguy, A., *J Polym Sci: Polym Phys Ed* (1980) 18:1137–1144. However, the NMMO/$H_2O$ system has significant disadvantages associated with its use, e.g. high temperature required for dissolution; the degradation of cellulose; side-reactions of the solvent itself without an antioxidant (Potthast, A., et al., *Holzforschung* (2000) 54:101–103); and its high cost. The high temperature requirement is of particular concern since complete dissolution occurs only above 130° C., which is close to the explosive point of about 150° C.

Some thiocyanate salt aqueous solutions (Dubose, A., *Bull Soc Ind Rouen* (1905) 33:318–321; Williams, H. E., *Mem Proc Manchester Lit Phil Soc* (1921) 65:1–14; Williams, H. E., *J Soc Chem Ind* (1921) 40:221T-224T) and liquid $NH_3$ solutions (Cuculo, J. A., et al., in *Polymeric Materials Encyclopedia*, Salamone, J. C., Ed., CRC Press: New York (1996) Vol. 2, pp 1029–1035; Scherer, P. C., *J Am Chem Soc* (1953) 53:4009–4013) are capable of dissolving cellulose. However, all of the combinations in the aqueous system need elevated temperature above 100° C. for the dissolution, resulting ultimately in thermal degradation of the cellulose. It seems that water is not a powerful enough swelling agent for cellulose under mild conditions. The $NH_3$/$NH_4SCN$ system has been disclosed for use as a solvent for cellulose (see e.g. Hudson, S. M., PhD Dissertation, Fiber and Polymer Science School of Textiles, North Carolina State University, Raleigh, N.C., United States of America (1981)); but, the system requires a condensation step to supply the solvent with liquid $NH_3$ and in its use and/or storage, care must be exercised to minimize its volatilization to avoid subsequent crystallization of $NH_4SCN$.

Blackwell et al. (Lee, D. M. and Blackwell, J., *J Polym Sci: Polym Phys Ed* (1981) 19:459–465) elucidated the structure of cellulose-hydrazine complex by X-ray diffraction. Hydrazine molecules interact with and break intermolecular hydrogen bondings network of cellulose chains. Under severe conditions, above 150° C. and 5 atm, it dissolves cellulose (U.S. Pat. No. 4,028,132 to Litt, M. H. and Kumar, N. G. (1977)). However, this system is limited to closed systems and is extremely violent. See also Trogus, C. and Hess, K., *Z Phys Chem* (1931) B14:387–395.

Accordingly, there exists a need for compositions and methods that can be used, among other applications, in producing cellulosic articles (e.g. films or fibers) in an economically and environmentally acceptable manner. The present invention addresses these and other needs in the art.

SUMMARY OF INVENTION

Cellulose solvents, cellulose compositions, cellulose articles and methods of making and using the same are disclosed. For example, a cellulose composition comprises cellulose dissolved in the following solvent: an amine-based composition, provided however, the amine-based composition is not ammonia; and a salt selected from the group including a thiocyanate salt, a halide salt, and a nitrate salt.

Optionally, the amine-based composition has the general formula:

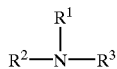

where $R^1$, $R^2$ and $R^3$ are the same or different, and $R^1$, $R^2$, $R^3$ are selected from the group consisting of hydrogen, amino, alkyl, alkylamino, alkenyl, alkenylamino, alkynyl, alkynlamino, combinations thereof, and hydrated forms thereof; provided however, $R^1$, $R^2$, and $R^3$ are not all hydrogen at the same time. Optionally, the amine-based composition is selected from the group consisting of hydrazine, hydrazine hydrate, and ethylenediamine.

The amine-based composition can be present in an amount ranging from about 20 to about 60 wt % and the salt can be present in an amount ranging from about 40 to about 80 wt %. Optionally, up to about 20 w/w % of cellulose is dissolved in the solvent, alternatively about 1 to about 15 w/w % cellulose is dissolved in the solvent. The cellulose composition can comprise an anisotropic phase.

Accordingly, it is an object of the present invention to provide a solvent composition for cellulose, a cellulose composition, and methods for making and using the same. The object is achieved in whole or in part by the present invention.

An object of the invention having been stated herein above, other objects will become evident as the description proceeds when taken in connection with the accompanying Examples and Drawings as best described herein below.

BRIEF DESCRIPTION OF THE DRAWINGS

(FIG. 2B) T=50° C. Solid circles, $\Delta H_{mix}$=0 cal; open circles, $\Delta H_{mix}$=–200 cal; solid triangles, $\Delta H_{mix}$=–400 cal; open triangles $\Delta H_{mix}$=–600 cal; solid squares, $\Delta H_{mix}$=–800 cal; open squares, $\Delta H_{mix}$=–1000 cal.

DETAILED DESCRIPTION OF THE INVENTION

Figure 1:
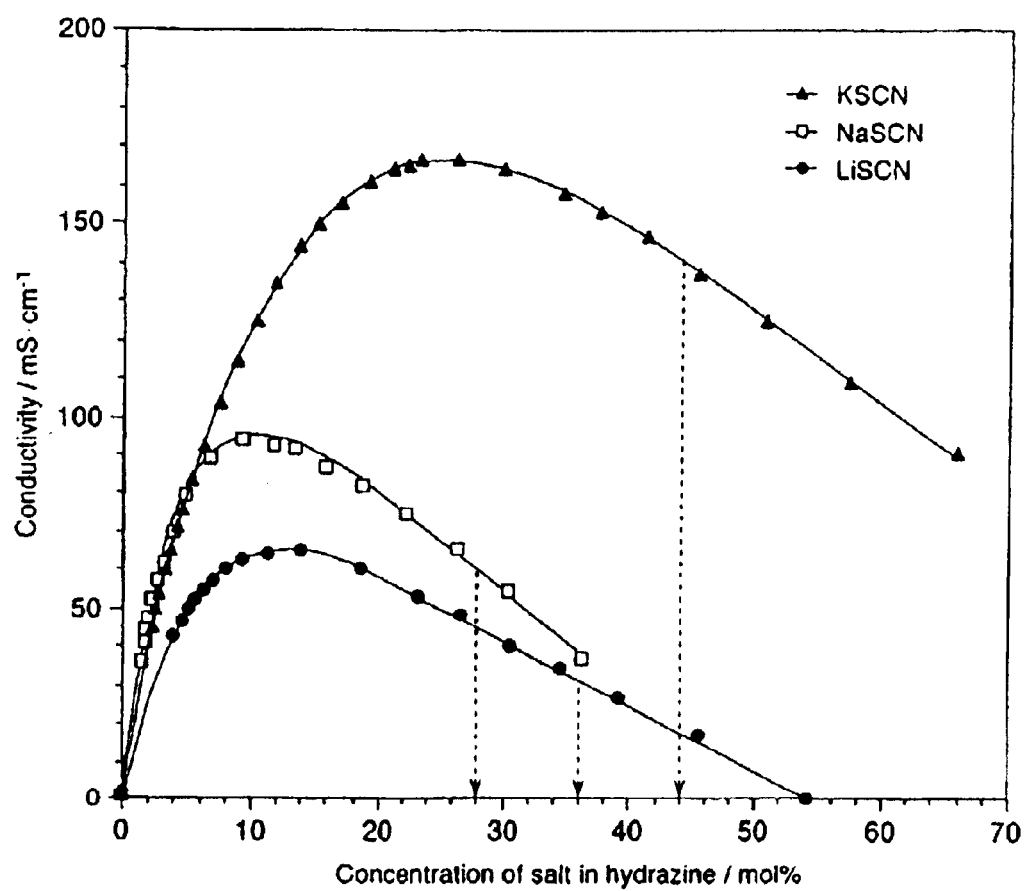
FIG. 1 is a graph depicting conductivity of thiocyanate in hydrazine at 25° C. The arrows indicate minimum concentration of thiocyanate required for dissolving cell I (DP210). Solid triangles, KSCN; open squares, NaSCN; solid circles, LiSCN.

The present invention provides, in one aspect, a solvent system to dissolve cellulose, preferably under ambient conditions. The exploration of solubility and solution properties of cellulose in an amine/salt system to produce a simple and convenient cellulose solvent is disclosed.

Following long-standing patent law convention, the terms "a" and "an" mean "one or more" when used in this application, including the claims.

The term "about", as used herein when referring to a value or to an amount of mass, weight, time, volume, or percentage is meant to encompass variations of ±2%, preferably ±1%, more preferably ±0.5%, and still more preferably ±0.1% from the specified amount, as such variations are appropriate to perform the disclosed methods or to prepare the disclosed compositions.

I. Compositions and Methods of Making the Same

A solvent composition for use in dissolving cellulose is disclosed. In one embodiment, the solvent composition comprises an amine-based composition (provided however, the amine-based composition is not ammonia); and a salt comprising one of a thiocyanate salt, a halide salt, or a nitrate salt. The amine-based composition and/or salt is/are chosen based on a variety of parameters. For example a preferred amine-based composition has a boiling point at greater than ambient temperature to facilitate ease of use. Safety and expense are also relevant parameters for the amine-based composition and/or salt, as is the ability to provide cellulose dissolution at concentrations that have desirable commercial and Theological characteristics. That is, the solvent should provide reasonably concentrated cellulose solutions having viscosities that can be readily manipulated by a fiber or film producer.

Additional parameters include but are not limited to the size of the molecules, electronic structure of the molecules, dielectric characteristics of the molecules, and complexing characteristics of the molecules, including behavior in complexes with each other and with cellulose. For example, the amine-based composition and salt composition preferably demonstrate the capacity to associate with the each other to form a complex that can further associate with cellulose to provide for the dissolution of the cellulose, such as by hydroxyl exchange. However, the amine-based composition and salt are preferably not so reactive towards each other so as to significantly impair associations with cellulose. Additional guidance for these and other criteria are provided in the Examples, including but not limited to the cellulose dissolution profile provided by the conductivity assessment presented in FIG. 1 and the free energy of mixing assessment presented in FIGS. 2A and 2B.

Monoamine and diamine compositions are representative amine-based compositions. In one embodiment the amine-based composition comprises the general formula:

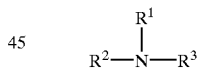

where $R^1$, $R^2$ and $R^3$ are the same or different, and $R^1$, $R^2$, $R^3$ are selected from the group consisting of hydrogen, amino, alkyl, alkylamino (which include primary, secondary and tertiary amines), alkenyl, alkenylamino (which include primary, secondary and tertiary amines), alkynyl, alkynlamino (which include primary, secondary and tertiary amines) as defined herein below, combinations thereof, and hydrated forms thereof; provided however, $R^1$, $R^2$, and $R^3$ are not all hydrogen at the same time.

In another embodiment, $R^1$, $R^2$ and $R^3$ are the same or different, and $R^1$, $R^2$, $R^3$ are selected from the group consisting of hydrogen, amino, $C_1$ to $C_5$ branched or straight chain alkyl, and $C_1$ to $C_5$ branched or straight alkylamino (which include primary, secondary, or tertiary amines) and hydrated forms thereof; provided however, $R^1$, $R^2$, and $R^3$ are not all hydrogen at the same time.

"Alkyl" refers to an aliphatic hydrocarbon group that can be straight or branched having 1 to 5 carbon atoms in the chain. When an amino group atom is present the "alkyl" can also be described as an "alkylamino". "Branched" refers to an alkyl group in which an additonal alkyl group, such as methyl, ethyl or propyl, is attached to a linear alkyl chain. Exemplary alkyl groups include methyl, ethyl, propyl, isopropyl, n-butyl, sect-butyl, tert-butyl, and n-pentyl. The group can be optionally substituted or unsubstituted. "Dialkylamino" refers to an —NRR' group wherein each of R and R' is independently an alkyl group. Exemplary dialkylamino groups include ethylmethylamino, dimethylamino and diethylamino.

"Alkenyl" refers to an "alkyl" as defined herein, containing at least one carbon-carbon double bond. The alkenyl group can be optionally substituted or unsubstituted. Exemplary alkenyl groups include vinyl, allyl, and n-pentenyl. When an amino group is present the "alkenyl" can also be described as an "alkenylamino".

"Alkynyl" to an "alkyl" as defined herein, containing a carbon-carbon triple bond. The alkynyl group can be optionally substituted or unsubstituted. Exemplary alkynyl groups include ethynyl, propargyl, and n-pentynyl. When an amino group is present the "alkynyl" can also be described as an "alkynylamino".

"Halo" or "halide" refers to fluoride, chloride, bromide or iodide.

Any suitable thiocyanate (SCN) salt, halide salt, or nitrate salt can be employed in the solvent composition, including but not limited to sodium (Na), potassium (K), lithium (Li), and ammonium ($NH_4$) salts.

Optionally, the amine composition is selected from the group consisting of hydrazine, hydrazine hydrate, and ethylenediamine. The amine composition can be present in the solvent in an amount ranging from about 20 to about 60 wt %, including about 25, 30, 35, 40, 45, 50, and 55 wt %. The salt can be present in an amount ranging from about 40–80 wt %, including about 45, 50, 55, 60, 65, 70, and 75 wt %. Optionally, the solvent can comprise water, which can be employed when a halide salt or a nitrate salt is employed, for example.

A method of making a solvent composition for cellulose is also disclosed. In one embodiment, the method comprises mixing an amine-based composition as disclosed herein with a salt composition as disclosed herein. Additional representative embodiments are disclosed in the Examples.

A cellulose composition is also provided. In one embodiment, the composition comprises cellulose dissolved in a solvent comprising: (a) an amine-based composition as disclosed herein above; and (b) a salt comprising one of a thiocyanate salt, a halide salt, or a nitrate salt. Any suitable thiocyanate (SCN) salt, halide salt, or nitrate salt can be employed in the solvent composition, including but not limited to sodium (Na), potassium (K), lithium (Li), and ammonium ($NH_4$) salts.

Optionally, the amine-based composition is selected from the group consisting of hydrazine, hydrazine hydrate, and ethylenediamine. The amine-based composition can be present in the solvent in an amount ranging from about 20 to about 60 wt %, including about 25, 30, 35, 40, 45, 50, and 55 wt %. The salt can present in the solvent in an amount ranging from about 40–80 wt %, including about 45, 50, 55, 60, 65, 70, and 75 wt %. Optionally up to about 20 w/w % of cellulose is dissolved in the solvent, including about 1, 2, 3, 4, 5, 6, 7, 8, 9, 10, 11, 12, 13, 14, 15, 16, 17, 18, 19 and 20. Optionally, the solvent can comprise water, which can be employed when a halide salt or a nitrate salt is employed, for example. Depending on the cellulose concentration and the degree of polymerization (DP), the cellulose composition can comprise an anisotropic phase. Additional representative embodiments are disclosed in the Examples.

A method for forming a cellulose composition is also disclosed. In one embodiment, the method comprises dissolving cellulose in a solvent as disclosed herein, to thereby form a cellulose solution. Additional representative embodiments are disclosed in the Examples.

Cellulose from any source can be employed, including regenerated cellulose. Any cellulose polymorph can be employed, and representative polymorphs are set forth in the Examples. In one embodiment prior to using the cellulose, it is separated and recovered from the raw material as more or less delignified cellulosic fibers. Conventional pulping techniques are employed to accomplish this. The particular pulping technique used is not critical. The cellulose quality necessary for use in the present technique is the same as that used in the viscose rayon process. Cellulosic materials useful in the viscose rayon or cuprammonium process can be employed in the present invention.

Suitable sources of cellulose include wood fibers of softwoods and/or hardwoods; bast fibers such as flax, jute, hemp and ramie; leaf fibers such as sisal; and seed fibers such as those from crude or purified cotton. Normally, cellulosic fibers are prepared by pulping the raw material to liberate the fiber from the lignin and other materials. Pulping is not necessary, however, to liberate cellulosic fibers from materials such as cotton, where the cellulose content is very high.

II. Cellulose Articles and Methods of Making the Same

A cellulose article and a method of making the same are also provided. In one embodiment, the article is prepared from and comprises a cellulose composition as disclosed herein. That is, the article is prepared from a cellulose composition comprising: cellulose dissolved in a solvent comprising: (a) an amine-based composition as disclosed herein above; and (b) a salt comprising one of a thiocyanate salt, a halide salt, or a nitrate salt. Any suitable thiocyanate salt, halide salt, or nitrate salt can be employed in the solvent composition, including but not limited to sodium (Na), potassium (K), lithium (Li), and ammonium ($NH_4$) salts.

Optionally, the amine-based composition is selected from the group consisting of hydrazine, hydrazine hydrate, and ethylenediamine. The amine-based composition can be present in the solvent in an amount ranging from about 20 to about 60 wt %, including about 25, 30, 35, 40, 45, 50, and 55 wt %. The salt can present in the solvent in an amount ranging from about 40–80 wt %, including about 45, 50, 55, 60, 65, 70, and 75 wt %. Optionally up to about 20 w/w % of cellulose is dissolved in the solvent, including about 1,2, 3,4, 5,6, 7, 8, 9, 10, 11, 12, 13, 14, 15, 16, 17, 18, 19 and 20. Optionally, the solvent can comprise water, which can be employed when a halide salt or a nitrate salt is employed, for example. Depending on the cellulose concentration and DP, the cellulose composition can comprise an anisotropic phase. Additional representative embodiments are disclosed in the Examples.

In one embodiment, the article is a cellulose fiber. The cellulose fiber can be prepared in any suitable manner, such as but not limited to wet spinning. In another embodiment, the article is a cellulose film. The cellulose film can be prepared in any suitable manner, such as but not limited to extrusion of the cellulose composition into a coagulation bath.

Prior to preparing articles (e.g. fibers and films) from the cellulose solution, the solution is filtered and deaerated to remove any impurities or particles that might otherwise block the spinnerette holes. Deaeration is used to remove air bubbles from the cellulose solution. The filtering techniques used are known to those skilled in the art and include methods similar to those used in the cuprammonium process and viscose process.

Figure 5:
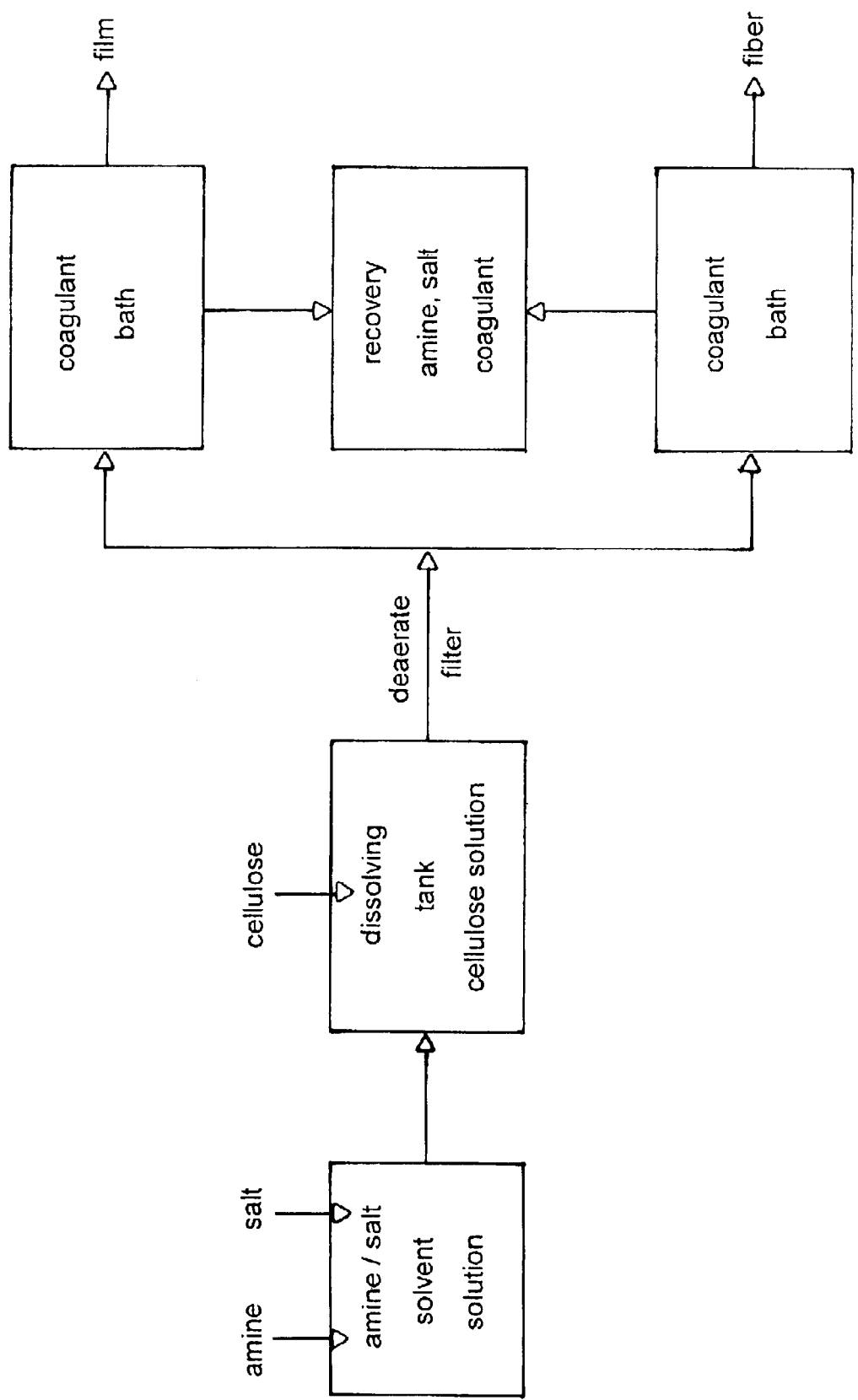
FIG. 5 is a flow diagram for a method of making a cellulose article by wet spinning of a cellulose composition as disclosed herein.

A typical flow sheet for the present method is shown in FIG. 5. Initially a solvent solution is prepared, optionally in an agitated vessel. The solvent solution can be used immediately or can be stored until needed. The cellulose is added to the solvent solution to form a cellulose solution as disclosed herein. Typically this is done in an agitated vessel to facilitate dissolution of the cellulose. The cellulose solution can be held in this vessel until its visco-elastic properties have stabilized or it can be pumped to a separate storage vessel. The cellulose solution can be stored until needed. Fibers can be prepared directly from the solvent-cellulose composition, preferably after deaeration and filtration once the visco-elastic properties have stabilized. Regardless of the procedure employed, finely ground materials, such as titanium dioxide, can be incorporated into the solution to control the luster of the fibers produced.

As also shown in FIG. 5, films can be formed directly from the solvent-cellulose solution by extrusion into a suitable coagulation bath such as those used in fiber formation. Recovery and purification of the amine, salt, and coagulant bath can be carried out simultaneously or later.

III. EXAMPLES

The following Examples have been included to illustrate modes of the invention. Certain aspects of the following Examples are described in terms of techniques and procedures found or contemplated by the present co-inventors to work well in the practice of the invention. These Examples illustrate standard laboratory practices of the co-inventors. In light of the present disclosure and the general level of skill in the art, those of skill can appreciate that the following Examples are intended to be exemplary only and that numerous changes, modifications, and alterations can be employed without departing from the scope of the invention.

III.A. Example 1

Hydrazine/Salt System

This Example describes the investigation of the solubility and solution properties of cellulose in a hydrazine ($NH_2NH_2$)/salt system. The hydrazine/salt system has been found to be an excellent solvent for cellulose. The solubility and solution properties were investigated. Even at room temperature the combinations of hydrazine and lithium, sodium, and potassium thiocyanate had high dissolution power for cellulose up to 18% w/w maximum unrelated to the polymorph, while the combination with ammonium thiocyanate exhibited a solubility difference among cellulose I, II, and III.

The effect of temperature cycling of the system for the rapid dissolution of cellulose was investigated thermodynamically. In these systems a high concentration of salts played a role in effecting the cellulose dissolution, suggesting that undissociated salt-solvent complex played a role in the cellulose dissolution as intimated by electroconductivity measurements of the hydrazine/salt system. Gel and liquid crystal formation were observed in all systems respectively above 4% and 6% w/w cellulose concentration. The gelation temperature was between about 10° C. and 50° C., depending on salt and cellulose concentration. The dependence of cellulose solubility on DP was also described. These solvent systems have high potential for fiber and film formation of cellulose.

Experimental Materials and Methods for Example 1

Solubility Measurements of Inorganic Salts in Hydrazine and Ammonia. All salts were chemical reagent grade and except for drying as described below were used without further purification. $NH_4SCN$ and other salts were dried respectively at 60° C. and 110° C. overnight in a vacuum oven. LiSCN was available only as a multihydrate. It was converted to the anhydrous form by heating overnight at 110° C. under vacuum. Anhydrous hydrazine and ammonia were used directly as commercial grade.

A known amount of dried salt (0.100 mol) was placed in a 100 milliliter (mL) three-neck flask under nitrogen equipped with a magnetic stirrer-tip, thermometer, and dropping funnel. After the flask attained 25° C. in a constant temperature bath, hydrazine in the funnel was dropped slowly onto the salt while stirring until the salt was completely dissolved, as observed visually. In the case of ammonia, a condenser containing dry ice instead of the dropping funnel was used to add the ammonia. Aminuddin, N., MS Thesis, Department of Textile Engineering, Chemistry, and Science, North Carolina State University, Raleigh, N.C., 1993; Chapter 3, pp 38–40. After dissolution of the salt, the flask was taken from the bath and weighed. The solubility of the salt was determined from the weight ratio of the salt to added solvent.

Solubility Measurements of Cellulose in the Hydrazine/Salt System and Ammonia/Salt System. The following cellulose samples were prepared and dried at 60° C. in a vacuum oven prior to use. Several samples were treated by acid hydrolysis to reduce the molecular weight of the cellulose according to the method of Nevell et al. (Nevell, T. P., in *Cellulose Chemistry and its Applications*; Nevell, T. P.; Zeronian, S. H, Eds.; Ellis Horwood Limited: Chichester, 1985; Chapter 9, pp 223–242). The molecular weight and degree of polymerization (DP) were estimated by viscometric measurements in cuene (cupriethylenediamine hydroxide solution) applying the ASTM D1795 and D4243 methods, in *Annual Book of ASTM Standards*; American Society for Testing and Materials: Philadelphia, 1999

Cellulose was prepared/obtained as follows:

Cell I (DP716*): Cellunier P obtained from ITT Rayonier, Inc., Jacksonville, Fla., United States of America.

Cell I (DP536): Obtained by acid hydrolysis of Cellunier P for 3 h at 50° C.

Cell I (DP376): Obtained by acid hydrolysis of Cellunier P for 5 h at 50° C.

Cell I (DP210†): Cellulose Powder CC41 obtained from Whatman Bio Systems, Inc., Newton, Mass., United States of America.

Cell II (DP216): Obtained from Wako Chemicals, Inc., Richmond, Va., United States of America.

Cell III (DP204): Obtained by liquid $NH_3$ treatment of Cellulose Powder CC41 overnight.

†Calculated by Whatman Bio Systems, Inc.
*Calculated from the sedimention coefficient of a nitrated sample of the pulp by ITT Rayonier, Inc.

A known amount of cellulose was placed in a sealable polyethylene bag (15×20 cm). Ten grams of the ammonia or hydrazine solution saturated salt was added to the bag with a Pasteur pipette. After removing air from the bag, the mixture was cooled down to −10C for 1 hour (h), then warmed to 50° C. for 30 minutes (min) together with intermittent shearing using a wooden roller. The mixture was subjected several times to this temperature cycling technique. Cuculo, J. A., et al., *J Polym Sci Part A: Polym Chem* (1994) 32:241–247. By increasing the cellulose concentration by 1.0% w/w increments, the solubility of the cellulose was determined. The maximum cellulose solubility was considered to be the concentration observed just prior to the one exhibiting undissolved cellulose after 5 days. Judgment of the dissolution was done by visual observation through a polarizing microscope (OPTIPHOT® Model III, available from Nikon, Inc. of New York, N.Y., United States of America) under crossed polars.

Electroconductivity Measurements of Hydrazine Solutions of LiSCN, NaSCN, and KSCN. The degree of dissociation of LiSCN, NaSCN, and KSCN in hydrazine was estimated by electroconductivity. To a saturated hydrazine solution of the salt, anhydrous hydrazine was added dropwise with a burette, and the conductivity depending on salt concentration was measured at 25.0±0.1° C. The conductivity meter used was the Orion Model-162 equipped with an Orion Conductivity Cell Model-013030 as a probe, calibrated with KCl standard solutions and available from Thermo Orion of Beverly, Mass., United States of America.

Observation of Gelation and Liquid Crystal Formation of the Cellulose/Hydrazine/Salt System. Five grams of cell I (DP210) solution covering seven cellulose concentrations in $NH_2NH_2$/LiSCN, NaSCN, and KSCN, respectively, was placed in 21 individual sample tubes, and the tubes were closed tightly with a screw cap. All the tubes were kept at 60° C. overnight to dissolve gel completely, and then cooled rapidly down to 10° C. at intervals of 5° C. in a constant temperature bath. In the $NH_2NH_2$/NaSCN system the cooling intervals were set at 1° C. from 20° C. because all the cellulose/$NH_2NH_2$/NaSCN solutions were converted to gel within a small temperature range between 10 and 20° C. Gel formation was observed after 10 min, 30 min, 1 h, 3 h, 6 h, and 24 h by the ball dropping method (SUS 304, 3/22 inch; Harrison, M. A., et al., *Br Polym J* (1971) 3:154). The gelation point was taken at the complete disappearance of fluidity. Liquid crystal formation was determined using a microscope having crossed polars (OPTIPHOT® Model III, available from Nikon, Inc. of New York, N.Y., United States of America), equipped with an electrical hot stage. The samples for analysis were centrifuged at 3,000 revolutions per minute (rpm) for 1 h to remove air, and then placed carefully between glass plates.

Results and Discussion For Example 1

Solubility Measurements of Cellulose I in Hydrazine/Salt System. Scherer (Scherer, P. C., *J Am Chem Soc* (1953) 53:4009–4013) discovered that five salts, $NH_4SCN$, NaSCN, $NaNO_3$, NaI, and $NH_4I$ in liquid ammonia were effective for dissolving cellulose, although $NH_4I$ was ineffective for cellulose I. However, the Scherer data are lacking in quantitative detail because the boiling point of all the solvents are below 0° C. except for $NH_3$/$NH_4SCN$. Hence, it is difficult to determine the accurate solubility of cellulose and other solution properties at ordinary ambient conditions. Many years later, the properties of the $NH_3$/$NH_4SCN$ system were discussed in detail by Cuculo and Hudson. See e.g., Hudson, S. M., PhD Dissertation, Fiber and Polymer Science, School of Textiles, North Carolina State University, Raleigh, N.C., United States of America (1981).

Hydrazine has a boiling point of 113.5° C., which is much higher than that of ammonia (−33.4° C.). In this Example, the solubility of several inorganic salts that dissolved in hydrazine, as well as their respective dissolution potential for cellulose, have been studied. The results compared to those of the ammonia system are summarized in Table I. In Table I, cell I of DP210 is used unless otherwise specified.

TABLE I

Solubility of salt in $NH_3$ and $NH_2NH_2$ at 25° C. and Dissolution power for cellulose I

| Salt | Solubility of salt in 100 g of $NH_3$ and $NH_2NH_2$ | Weight fraction Salt, Amine | Mole fraction Salt, Amine | Dissolution power for cell I in 100 g of the solvent |
|---|---|---|---|---|
| $NH_4SCN$ | 399.3 g/$NH_3$[a] | 0.800, 0.200 | 0.472, 0.528 | 27 g |
|  | 318.4 g/$NH_2NH_2$[‡] | 0.761, 0.239 | 0.572, 0.428 | Insoluble |
| LiSCN | 353.8 g/$NH_3$ | 0.780, 0.220 | 0.481, 0.519 | Insoluble |
|  | 109.9 g/$NH_2NH_2$ | 0.524, 0.476 | 0.351, 0.649 | 14 g |
| NaSCN | 205.5 g/$NH_3$[b] | 0.673, 0.327 | 0.302, 0.698 | Soluble[†,c] |
|  | 91.4 g/$NH_2NH_2$ | 0.478, 0.522 | 0.265, 0.735 | 18 g |
| KSCN | 282.9 g/$NH_3$ | 0.739, 0.261 | 0.331, 0.669 | Soluble* |
|  | 200.4 g/$NH_2NH_2$ | 0.667, 0.333 | 0.398, 0.602 | 14 g |
| $NaNO_3$ | 97.6 g/$NH_3$[b] | 0.494, 0.506 | 0.164, 0.836 | Soluble[†,c] |
|  | 105.9 g/$NH_2NH_2$ | 0.514, 0.486 | 0.285, 0.715 | Swollen |
| NaI | 161.9 g/$NH_3$[b] | 0.618, 0.382 | 0.155, 0.845 | Soluble[†,c] |
|  | 65.5 g/$NH_2NH_2$ | 0.396, 0.604 | 0.123, 0.877 | 16 g |

[a]Hudson, S. M., PhD Dissertation, Fiber and Polymer Science, School of Textiles, North Carolina State University, Raleigh, North Carolina, United States of America (1981).
[b]Hunt, H. J., Am Chem Soc (1932) 54: 3509
[c]Scherer, P. C., J Am Chem Soc (1953) 53: 4009–4013. Maximum solubility was not described because of low boiling point.
[†]Molecular weight is unknown.
[‡]Solvolysis (See equation 1)
*Maximum solubility was not measured because of low boiling point (−9° C.).

The solubility of $NH_4SCN$ in liquid ammonia and the quantitative dissolution power for cellulose have been reported in the background art by Hudson and Cuculo et al. See e.g., Hudson, S. M., PhD Dissertation, Fiber and Polymer Science, School of Textiles, North Carolina State University, Raleigh, N.C., United States of America (1981). The maximum concentration of cellulose achieved was 10 and 14% w/v, respectively, for cell I (Cellunier P, DP716) and for cell 11 (DP355), the latter prepared by alkali aging of Cellunier P. The percent weight per volume used by Hudson et al. (Hudson, S. M., Cuculo, J. A., and Wadsworth, L. C., *J Polym Sci: Polym Chem Ed* (1983) 21:651–670) can be replaced by percent weight per weight without any modification since the density of the solvent was ca. 0.99 g/$cm^3$ at 25° C. Hudson et al. gave the following relationship between the density (ρ) in g/mL and Kelvin temperature (T) in the $NH_3$/$NH_4SCN$ solvent: ρ=−6.51×$10^{-4}$T+1.18. The maximum solubility of cell I (DP210) measured by Hudson et al. was 27% w/w.

The dissolving power of the $NH_2NH_2$/$NH_4SCN$ system was found to be lower than that of the $NH_3$/$NH_4SCN$ solvent, even though the solubility of $NH_4SCN$ in hydrazine was remarkably higher than that of the other salts at 1.336 mol/mol·$NH_2NH_2$. Only cell III (DP204) dissolved in this solvent up to 4% w/w of solution. Although it is not applicants' desire to be bound by a particular theory of operation, the reason for this behavior can be found possibly in the chemical reaction between $NH_4SCN$ and hydrazine:

  (1)

Hydrazine is a diamine theoretically capable of reacting with two equivalents of $NH_4SCN$:

  (2)

The reaction between hydrazine and ammonium salt was reported by deBruyn (deBruyn, L., *Rec Trav Chim* (1896)

15:174–184) and Audrieth et al. (Audrieth, L. F. and Ogg, B. A., in *The Chemistry of Hydrazine*, John Wiley & Sons, New York, (1951); Chapters 8 and 10, pp. 167–180 and 197–208.) According to these reports, only the formation of monosalt, i.e., reaction (1) occurs under ordinary conditions, which can be determined by detection of the hydrazine content of the hydrazinium salts by the method of Vittal et al. (Vittal, J. P., et al., (1979) 26:1041–1042). As a result of reaction (1), there is no free $NH_4SCN$ in the hydrazine. It is all converted into hydrazinium salt. As will be described below, it was found that the size of the salt molecule was one of the factors affecting the solubility of cellulose in the $NH_2NH_2$/salt system. Although it is not applicants' desire to be bound by a particular theory of operation, the hydrazinium salt could be too large for ready formation of a definitive salt complex with hydrazine and cellulose. As a result, there is no dissolution of cellulose 1.

Of the salts tested, the solution of NaSCN dissolved in hydrazine, exhibited the highest solubility of cellulose in the hydrazine series. The maximum concentration of cell I (DP210) reached 18% w/w without formation of gel at room temperature (22° C.). The solution was so viscous that three days storage with shearing was required for complete dissolution. LiSCN and KSCN in hydrazine dissolved cell I (DP210) up to 14% w/w concentration. Both cellulose solutions, however, gelled promptly at room temperature. This behavior of the gel and the lyotropic properties of the solutions are discussed herein below.

It is also of interest to note that comparative LiSCN ammonia solution did not dissolve cell I (DP210) at all. The solubility of LiSCN was extremely high, 353.8 g/100 g·$NH_3$ (0.927 mol/mol·$NH_3$) at 25° C. According to Williams' theory (Williams, H. E., *Mem Proc Manchester Lit Phil Soc* (1921) 65:1–14; Williams, H. E., *J Soc Chem Ind* (1921) 40:221T-224T) on the dissolution mechanism of cellulose in neutral salt aqueous solutions, first, the formation of a solvated salt complex, LiSCN—$(H_2O)_x$, is required. However, the formation of such a salt-solvent cluster would compete with the dissociation of salt into cations and anions and the subsequent formation of solvated ions, $Li^+$ . . . $(H_2O)_x$ and $SCN^-$ . . . $(H_2O)_y$, through ion-dipole interaction.

Evidence supporting this competition can be seen in FIG. 1, which exhibits the degree of dissociation of LiSCN, NaSCN, and KSCN in hydrazine at 25° C. as a function of salt concentration. While Williams' theory is described toward aqueous salt solutions and although it is not applicants' desire to be bound by a particular theory of operation, it is felt that sufficient similarities exist between aqueous salt solutions and the salt solutions reported herein, that instructive comparisons can be made. The conductivity increases with increasing salt concentration up to about 13, 10, and 25 mol % for LiSCN, NaSCN and KSCN, respectively, in hydrazine solution. Although it is not applicants' desire to be bound by a particular theory of operation, this suggests that dissociation of the salt into ions and solvation of each ion occurred preferably over the formation of salt-solvent complex up to the given concentrations. Also, in the liquid ammonia medium, increasing interaction of $Li^+$ . . . $NH_3$ and $SCN^-$ . . . $NH_3$, respectively, was observed principally by means of Raman spectroscopy at LiSCN concentrations of 2.5 to 16.7 mol %. Lemley, A. T. and Lagowski, J. J., *J Phy Chem* (1974) 78:708–713. Further increase in the salt concentration in hydrazine caused the conductivity to decrease gradually. Although it is not applicants' desire to be bound by a particular theory of operation, this suggests that undissociated salt, i.e., salt-solvent complex exists at high concentrations, which increases with increasing salt concentration.

As the second step in Williams' theory (Williams, H. E., *Mem Proc Manchester Lit Phil Soc* (1921) 65:1–14), the solvent molecules in the salt-solvent cluster are replaced by the hydroxyl groups of cellulose through hydrogen bonds and/or dipole-dipole interactions effecting dissolution of cellulose. This involves the breaking of inter- and intramolecular hydrogen bonding of cellulose. This step applied to the comparative $NH_3$/LiSCN system may be expressed by equation (3):

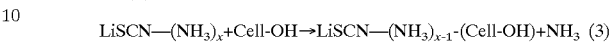

where "—" is noncovalent molecular interaction such as hydrogen bonding or dipole interaction; "Cell-OH" is cellulose.

The released ammonia might not be free but might complex with another LiSCN—$(NH_3)_x$ molecule again. Thus, although it is not applicants' desire to be bound by a particular theory of operation, it could be considered that the overall dissolution of cellulose in neutral aqueous salt solution proceeds via swelling. A factor in the sequence of steps in the dissolution process is the formation of a salt-solvent complex and the strength of the interaction between salt and solvent. FIG. 1 intimates that the salt-solvent complex, in the least required concentration to achieve cellulose dissolution, exists only in the region of extremely high salt concentration. For the formation of such a complex, high salt solubility in the solvent is needed. While the $NH_3$/LiSCN system satisfied this high salt concentration criterion, it had no dissolving power for cellulose. This behavior could be the result of an exceedingly strong interaction between LiSCN and ammonia due to the smaller size of the $Li^+$ ion (0.68 Å) compared to that of $Na^+$ (0.97 Å), $K^+$ (1.33 Å) and $NH_4^+$ (1.43 Å), respectively. A smaller ion has a stronger interaction than does a larger ion with an ion of opposite charge. This was reflected in the remarkably high solubility of LiSCN in ammonia and in the high boiling point of the solution (>100° C.). Apparently, the ammonia molecules in the LiSCN—$(NH_3)_x$ complex may not be easily substituted by cellulose hydroxyl groups. In contrast the more moderate binding of LiSCN with hydrazine permits this substitution leading ultimately to cellulose dissolution.

$NaNO_3$ in hydrazine did not dissolve cellulose I but merely brought about slight swelling. In ammonia cellulose dissolution was observed. From the results obtained in this series of $NH_2NH_2$/salt combinations, the order of $NaSCN>NaI>KSCN>>NaNO_3$ was determined as their dissolving power for cellulose. Scherer (Scherer, P. C., *J Am Chem Soc* (1953) 53:4009–4013) roughly estimated the dissolving power of $NH_3$/salt solutions for cellulose I by the dissolving time as follows:

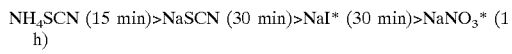

(*Small Amount of Water Required for Cellulose Dissolution)

NaI and $NaNO_3$ in ammonia dissolved cellulose I, however, the dissolution rates were very slow and small amount of water was required before dissolution of cellulose occurred. Although it is not applicants' desire to be bound by a particular theory of operation, it appears that the order in the hydrazine system is reasonably compatible with the above ammonia system except for the $NH_4SCN$ combination, and that the action of the hydrazine system is remarkably similar to that of the ammonia system in the dissolution of cellulose.

The Effect of Temperature Cycling in the Rapid Dissolution of Cellulose in the Hydrazine/Salt System. Cuculo et al. (Cuculo, J. A., et al., *J Polym Sci Part A: Polym Chem*

(1994) 32:241–247) developed the temperature cycling method. The technique subjects the cellulose/solvent system to a single or repeated cooling and heating cycles, bringing about the rapid dissolution of cellulose. It can be rationalized thermodynamically based on the balance of mixing entropy ($\Delta S_{mix}$) and enthalpy ($\Delta H_{mix}$) involving changes in the types of interactions between each molecule in the system. The result is a reduction of free energy in the system during the dissolving process. In the present Example, however, the effect of the temperature cycling process was rather smaller than that in the comparative cellulose/$NH_3$/$NH_4SCN$ system. The temperature range of the cycling was set between –10° C. and 50° C. since the cellulose/$NH_2NH_2$/NaSCN system froze solid below –15° C. In the preparation of cellulose solution in $NH_2NH_2$/NaSCN, the mole fraction of cellulose is relatively small compared to the mole fractions of hydrazine and NaSCN.

TABLE II

Mixing entropy change in the system of cell (5.0 g, DP210)/ hydrazine (52.2 g)/NaSCN (47.8 g) at –10° C. and 50° C.

| Mixing component | $T\Delta S_{mix}$/cal | |
|---|---|---|
| | –10° C. | 50° C. |
| $NH_2NH_2$/NaSCN† 52.2 g/47.8 g | 670 | 820 |
| $NH_2NH_2$/cellulose* 52.2 g/5.0 g | 0.8 | 1.0 |

†In the case that cellulose 5.0 g remains without mixing.
*In the case that NaSCN 47.8 g remains without mixing.

Table II shows these entropy changes at –10° C. and 50° C. At both temperatures $\Delta S_{mix}$, $NH_2NH_2$/NaSCN is much larger than $\Delta S_{mix}$, $NH_2NH_2$/cell. Therefore, from the viewpoint of entropy only, the system favors hydrazine mixing with salt as does the comparative $NH_3$/salt system (Cuculo, J. A., et al., *J Polym Sci Part A: Polym Chem* (1994) 32:241–247).

At low temperature in the comparative cellulose/$NH_3$/$NH_4SCN$ system, there is a large $\Delta H_{mix}$ derived mainly from the formation of hydrogen bonds of ammonia with cellulose, which must be a large enough negative value to offset the $T\Delta S_{mix}$. At higher temperatures such as room temperature, the $\Delta H_{mix}$ can be close to zero or a small positive value because of less hydrogen bonding of ammonia due to the rapid movement and existence of van der Waals forces between ammonia and $NH_4SCN$. The van der Waals forces between ammonia and cellulose cam be very small. Thus, free energy of mixing ($\Delta G_{mix}$) is reversed as $\Delta G_{mix}$, $NH_3$/cell<$\Delta G_{mix}$, $NH_3$/$NH_4SCN$ at low temperature. More ammonia associates with the cellulose from the mixture of the $NH_3$/$NH_4SCN$. As a result, the transformation into cellulose III is accelerated by the ammonia, and rapid dissolution of cellulose occurs (Cuculo, J. A., et al., *J Polym Sci Part A: Polym Chem* (1994) 32:241–247).

Consider now the $\Delta H_{mix}$ that occurs in the cellulose/$NH_2NH_2$/NaSCN system embodiment through affinity of the interaction between hydrazine and cellulose. Even at room temperature, the dissolution of cellulose was exothermic, i.e., the $\Delta H_{mix}$<0. A considerable exotherm was observed particularly at the initiation of dissolution. This indicates that hydrogen bonds between hydrazine and cellulose are formed vigorously even at room temperature, presumably due to less mobility of hydrazine compared to ammonia. The reduced motion of hydrazine is reflected in its remarkably higher boiling point (113.5° C.) compared to that of ammonia (–33.4° C.). The enthalpic effect of cellulose mixing is probably not zero but exothermic even at 50° C.

Figure 2:
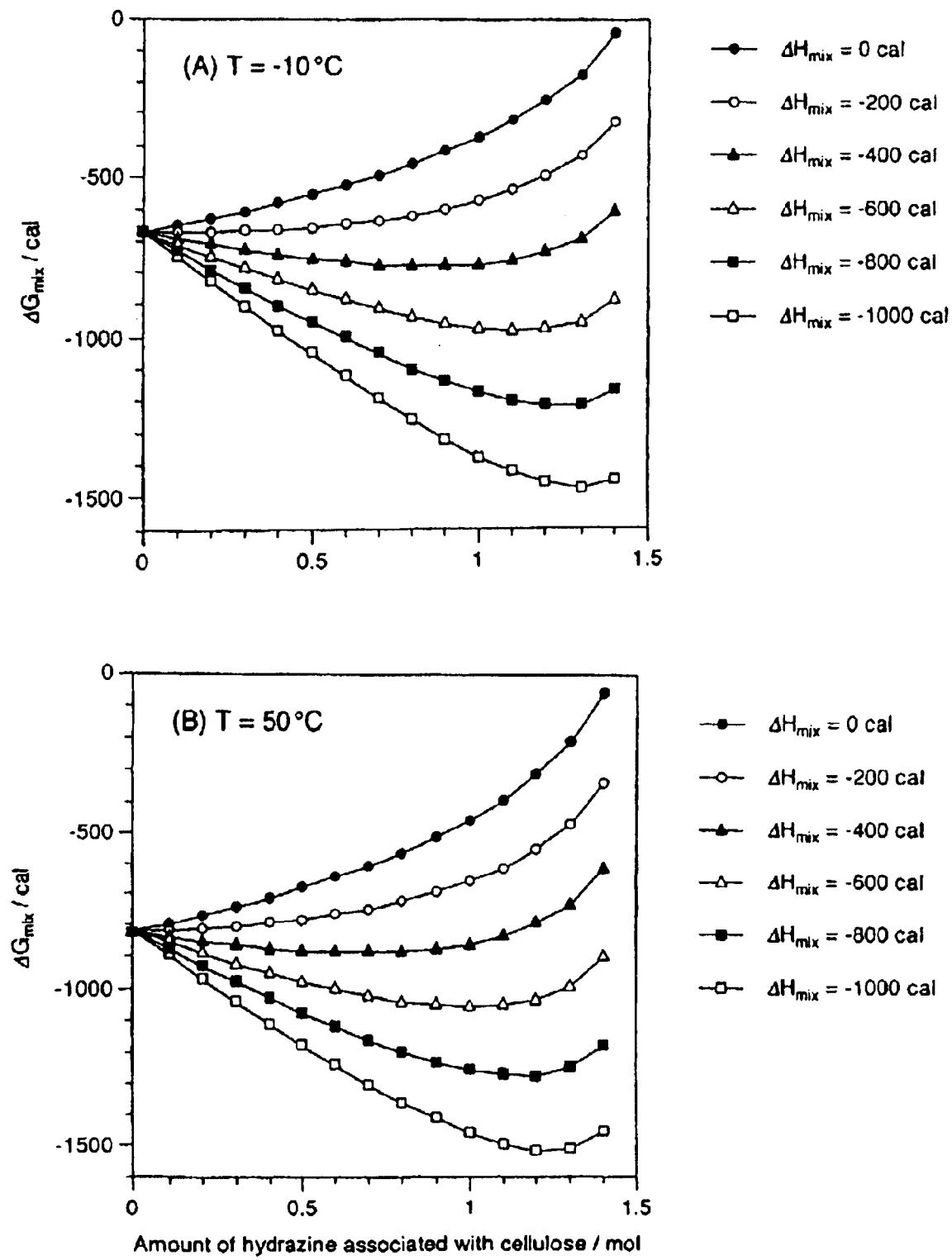
FIGS. 2A and 2B are graphs depicting free energy of mixing dependent on the amount of hydrazine associated with cellulose in the system of cell I (DP210)/$NH_2NH_2$/NaSCN 5 g/52.2 g/47.8 g at (FIG. 2A) T=–10° C.

FIGS. 2A and 2B show the $\Delta G_{mix}$ in the cell (DP210)/$NH_2NH_2$/NaSCN system as a function of the mount of hydrazine associated with cellulose under the mixing conditions shown in Table 2. If the $\Delta H_{mix}$ is lower than –0.6 kcal at 50° C., more than 1 mol of hydrazine is associated with cellulose when the $\Delta G_{mix}$ is minimized. As the temperature is lowered to –10° C., the $\Delta H_{mix}$ takes on large negative values due to more formation of hydrogen bonds between hydrazine and cellulose; however, the level of interaction of hydrazine with cellulose does not change greatly. Although hydrazine effects the morphological conversion of native cellulose to the III polymorph, the conversion rate is slower than those of ammonia and ethylenediamine Blackwell, J., et al., in *Cellulose—Structure, Modification and Hydrolysis*, Young, R. A.; Rowell, R. M., Eds.; Wiley Interscience: New York, (1986) Chapter 3, pp 51–66. Thus, the effect of cooling the cellulose/$NH_2NH_2$/NaSCN system from 50° C. to –10° C. appears to be too small to effectively bring about the rapid dissolution of cellulose. It is suggested that much lower temperature would be advantageous thermodynamically for the rapid dissolution, but the hydrazine system is frozen below –15° C. as described above, which limits diffusion of the solvent. That would prevent the motion of each component, i.e., mixing.

Gelation and Liquid Crystal Formation of the Cellulose/Hydrazine/Salt System. Recently, morphological studies (Frey, M. W., Cuculo, J. A., and Khan, S. A., *J Polym Sci Part B: Polym Phys* (1996) 34:2375–2381; Chen, Y.-S. and Cuculo, J. A., *J Polym Sci Part A: Polym Chem* (1986) 24:2075–2084; DeGroot, A. W.; et al., *J Polym Sci Part B: Polym Phys* (1991) 29:557–563; Yang, K.-S., Cuculo, J. A., and Theil, M. H. Ibid. (1992) 30:315–324; Frey, M. W.; Cuculo, J. A.; Spontak, R. J., *J Polym Sci Part B: Polym Phys* (1996) 34:2049–2058) have disclosed that the background art cellulose/$NH_3$/$NH_4SCN$ system experiences gelation and liquid crystal formation dependent upon cellulose concentration, cellulose DP and temperature. Also, liquid crystalline properties of chemically unmodified cellulose are discussed in a few solvent systems. Chanzy, H. and Peguy, A., *J Polym Sci: Polym Phys Ed* (1980) 18:1137–1144; Gilbert, R. D. and Patton, P. A., *Prog Polym Sci* (1983) 9:115–131; McCormick, C. L., et al., *Macromolecules* (1985) 18:2394–2401.

Figure 3:
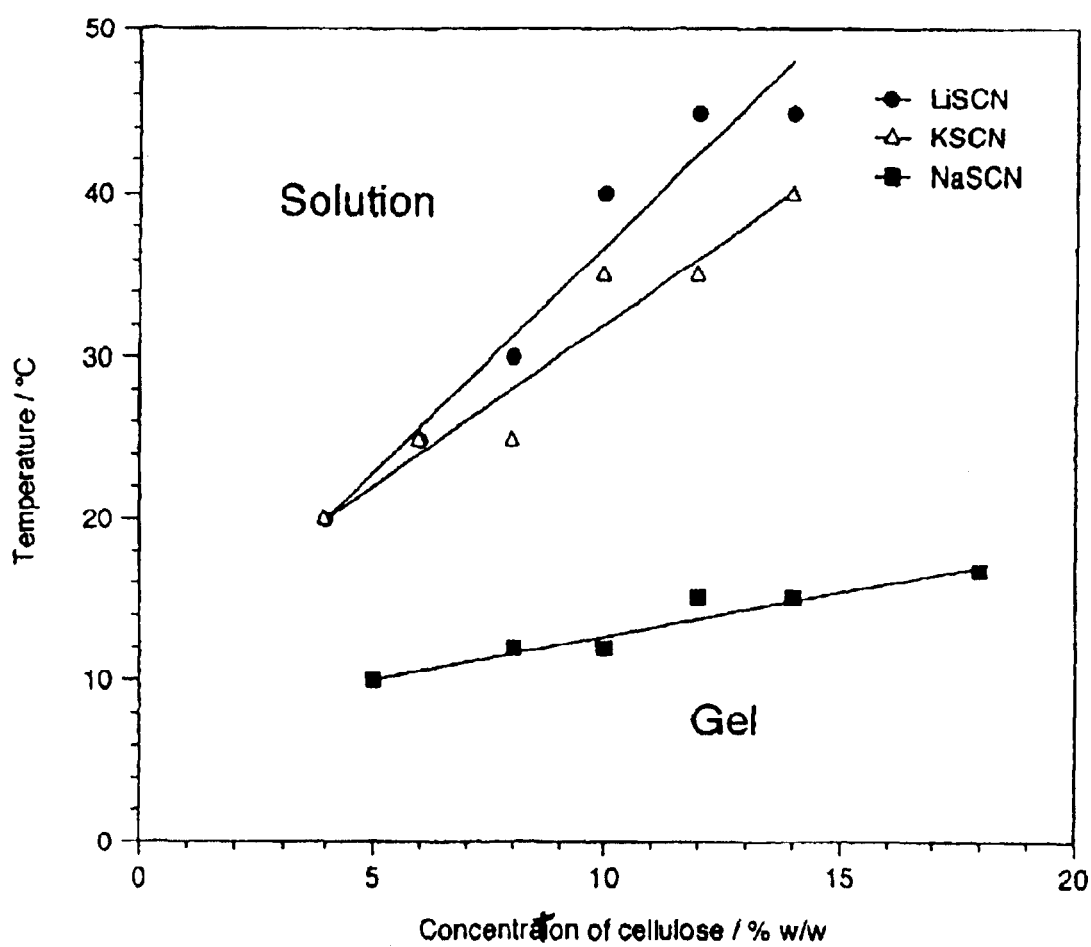
FIG. 3 is a phase diagram of cell I (DP210)/$NH_2NH_2$/thiocyanate system. Open triangles, KSCN; solid squares, NaSCN; solid circles, LiSCN.

In this Example gelation experiments revealed that cellulose gel was formed from 4% w/w of cell I (DP210) concentration in both $NH_2NH_2$/LiSCN and /KSCN solvents at 20° C. The solution of 5% w/w cellulose in $NH_2NH_2$/NaI also formed a gel at room temperature after 7 days storage. On the other hand, no gel phase was observed in the solution of cell I (DP210)/$NH_2NH_2$/NaSCN at room temperature at any cellulose concentration. Gel appeared for the first time when the system was cooled down to 17° C. at 18% w/w of cell I (DP210). The phase diagram is shown in FIG. 3.

Referring to the gelation diagram of a background art cell I (DP210)/$NH_3$/$NH_4SCN$ system (Frey, M. W.; Cuculo, J. A.; Spontak, R. J., *J Polym Sci Part B: Polym Phys* (1996) 34: 2049–2058), gel formation at 20° C. occurs from 4% w/w of cellulose, and the gelation time at 14% w/w is about 10 min at the same temperature (Frey, M. W., Cuculo, J. A., and Khan, S. A., *J Polym Sci Part B: Polym Phys* (1996) 34:2375–2381). In the $NH_2NH_2$/LiSCN and /KSCN, the initial gelation temperature of 20° C. at the initial gelation concentration of cell I (DP210) 4% w/w is very close to that of the $NH_3$/$NH_4SCN$ system. However, in both the cell I (DP210)/$NH_2NH_2$/LiSCN and /KSCN systems there was a considerably higher rate of the gelation temperature dependency on the cellulose concentration than in the $NH_3$/$NH_4SCN$ system. At the maximum, 14% w/w concentration of cell I (DP210), the solution gelled after 24 h even at 40 and 45° C., respectively, when KSCN and LiSCN were used. These gels were thermoreversible, as was the cellulose/$NH_3$/$NH_4SCN$ system. They melt above 50° C. Generally, the rate of physical gelation of the polymer solutions increases with a decrease in temperature due to the association of the chain segments with decreasing molecular motion. The gelation behavior observed at high temperature in the cellulose/$NH_2NH_2$/KSCN and /LiSCN suggests that the formation of gel occurs more rapidly in the low temperature region than it does in the comparative cellulose/$NH_3$/$NH_4SCN$ system.

The gelation temperatures of cell I (DP210)/$NH_2NH_2$/NaSCN were relatively low, and the dependence upon cellulose concentration was small. The gelation temperatures at all the cellulose concentrations were below those of the $NH_3$/$NH_4SCN$ system. The most significant difference between the KSCN or LiSCN and the NaSCN system was the absence of a cloud point at any cellulose concentration in the NaSCN system. The NaSCN system was a clear solution in the vicinity of room temperature. The cloud point appeared for the first time at about 10° C. at 5% w/w cell I (DP210) concentration by visual observation.

Figure 4:
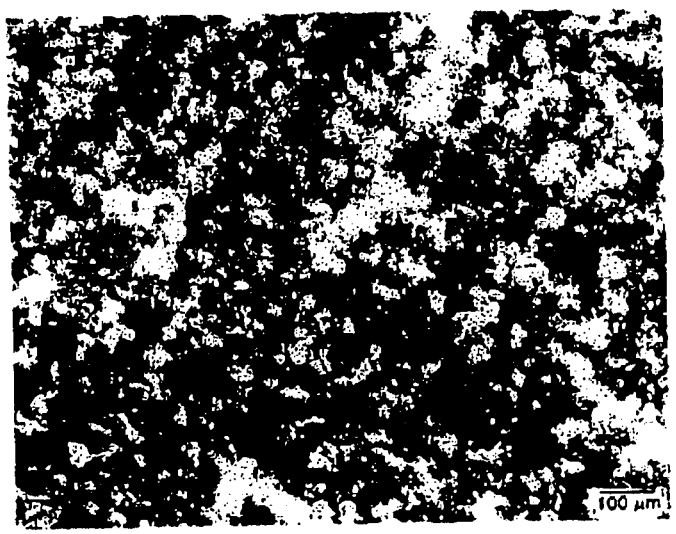
FIG. 4 is a crossed polars photomicrograph of 18% w/w of cellulose with DP210 in $NH_2NH_2$/NaSCN.

Further investigation disclosed mesophase patterns in the series of cellulose/$NH_2NH_2$/salt systems. All the samples prepared for microscopic observation of liquid crystal formation were subjected to centrifugation to remove air. FIG. 4 exhibits a photograph of 18% w/w cell I (DP210) solution in $NH_2NH_2$/NaSCN under crossed polars. The bright areas demonstrate strong birefringence attributed to an anisotropic phase since this cellulose gel is melted completely at room temperature. In the case of $NH_2NH_2$/LiSCN and /KSCN solvent, the system was stored on a hot stage at 60° C. for 24 h to ensure melting of the gel. The size of the bright domains increased with increasing cellulose concentration and DP. Evidence of the anisotropic phase was observed above 6% w/w of cell I (DP210) in the $NH_2NH_2$/KSCN and /LiSCN system and above 8% w/w in the $NH_2NH_2$/NaSCN solvent, respectively.

These concentrations suggest that the orienting behavior of cell I (DP210) in the $NH_2NH_2$/salt system is quite similar to that in the $NH_3$/$NH_4SCN$ system wherein liquid crystal formation take places at 7.5% w/w of minimum cell I (DP210) concentration (DeGroot, A. W.; et al., *J Polym Sci Part B: Polym Phys* (1991) 29:557–563). Chanzy et al. (Chanzy, H., et al., *J Polym Sci: Polym Lett Ed* (1979) 17:219–226) first reported non-modified cellulose solution having a strong birefringence in the system of $NMMO/H_2O$, depending upon water content and temperature. The anisotropic property was, however, found only at much higher cellulose concentration such as 20% w/w cell I (DP600) and 25% w/w cell I (DP130), respectively, at temperatures higher than 90° C. (Chanzy, H. and Peguy, A., *J Polym Sci: Polym Phys Ed* (1980) 18:1137–1144).

Relationship between Polymorphs of Cellulose and Solubility in the Hydrazine/Salt System. Generally, the solubility of cellulose depends strongly on its molecular weight and crystallinity. Solubility differences were observed also among the cellulose polymorphs in the $NH_2NH_2$/$NH_4SCN$ solvent. To study this more fully, maximum solubility of the different polymorphs of cellulose were measured in each of the $NH_2NH_2$/NaSCN, /KSCN, and /NaI solvents. The DP of the celluloses used for the measurements was fixed between 210 and 220 to eliminate DP as an influencing factor on solubility.

TABLE 3

Solubility of Cellulose in $NH_2NH_2$/salt system Depending on Cellulose Polymorph

| | Maximum Concentration/% w/w | | | |
|---|---|---|---|---|
| | $NH_2NH_2$/ | $NH_2NH_2$/NaSCN | $NH_2NH_2$/KSCN | $NH_2NH_2$/NaI |
| I[a] | Insoluble | 18 | 14 | 16 |
| II[b] | Swollen | 18 | 13 | 16 |
| III[c] | 4 | 18 | 14 | 16 |

[a]DP210, calculated by Whatman Bio Systems.
[b]DP216, calculated from the sedimentation coefficient by Wako Chemicals.
[c]DP204, estimated by viscosity measurement according to ASTM D4243 method.

As seen in Table 3, polymorph structure affected solubility only in $NH_2NH_2$/$NH_4SCN$. In this system, cell I (DP210) did not dissolve at all, while cell III (DP204) went into solution up to 4% w/w as described herein above. Recently, Cuculo et al. (Cuculo, J. A. et al., *J Polym Sci Part A: Polym Chem* (1994) 32:241–247; Cuculo, J. A., et al., *J Polym Sci Part A: Polym Chem* (1994) 32:229–239) reported the polymorph conversion of cellulose I to II to III and finally to amorphous in solution when cellulose I was dissolved in the $NH_3$/$NH_4SCN$ solvent. This implies that this solvent is most efficient in its interaction with cellulose III, which has a "looser crystalline" structure. Crystallinity index was found to be 0.60 and 0.41, respectively, in the cell I (DP210) and III (DP204) used in the comparative ammonia solvent used in this Example, suggesting that pretreatment of native cellulose by ammonia was effective in promoting dissolution. In this Example, the crystallinity index of cellulose was adapted to the ratio of the absorbance at 1372 $cm^{-1}$ (C—H bending) to that at 2900 $cm^{-1}$ (C—H stretching) in infrared spectrum, advocated by Nelson, M. L. and O'Connor, R. T., *J Apply Polym Sci* (1964) 8:1325–1341.

An interesting feature was seen in the case of cellulose II. The degree of swelling increased with increasing concentration of $NH_4SCN$ in the $NH_2NH_2$/$NH_4SCN$ system. When cell II (DP216) was dispersed in hydrazine only, the cellulose was not immediately swollen at room temperature. As the addition of $NH_4SCN$ progressed, optically microscopic observations revealed that the microcrystalline cell II (DP210) became rod-like. The degree of swelling was highest in the hydrazine saturated with $NH_4SCN$. This shows that higher concentration of salt, i.e., higher concentration of associated salt-solvent complex is effective for cellulose dissolution, which is consistent with the results of the electroconductivity measurement.

Conclusions. The $NH_2NH_2$/salt system dissolved cellulose even at room temperature. The salts, LiSCN, NaSCN, and KSCN, alkaline metal thiocyanates, as well as NaI were effective. $NH_4SCN$, which was effective in the ammonia system, had no beneficial effect with hydrazine in the dissolution of cellulose. The maximum solubility of cellulose DP210 reached 18% w/w in the $NH_2NH_2$/NaSCN 76/24 w/w.

From the conductivity measurements and the effect of salt concentration of the $NH_2NH_2$/salt solutions, it was found that undissociated salt-hydrazine complex played a role in the cellulose dissolution. This is achieved when salt solubility and concentration in these systems are high; however, too strong an interaction between salt and hydrazine prevents cellulose dissolution.

This system exhibited cellulose anisotropy. The liquid crystal formation occurred respectively above 6% w/w of cell I (DP210) in the $NH_2NH_2$/KSCN and /LiSCN and above 8% w/w of cell I (DP210) in the NH$_2$NH$_2$/NaSCN, which were much lower than that observed in other cellulose solvents such as LiCl/DMAc, TFA/chlorinated alkane, and NMMO/H$_2$O systems. Although it is not applicants' desire to be bound by a theory of operation, this suggests that the persistence length of cellulose is larger than that in the other solvent system. Also, gel formation was observed in the cellulose/NH$_2$NH$_2$/salt system. The gel was thermoreversible, and the formation was strongly dependent on temperature, cellulose concentration, and salt composition. The gelation temperature was 40° C. and 45° C., respectively, at 14% w/w cell I (DP210) in the NH$_2$NH$_2$/KSCN and /LiSCN. The gel in the NH$_2$NH$_2$/NaSCN was melted at room temperature.

Solubility differences were observed among cellulose polymorphs in the NH$_2$NH$_2$/NH$_4$SCN system. The cell I polymorph (DP210) was neither swollen nor dissolved, the cell II polymorph (DP216) was swollen depending on salt concentration, and the cell III polymorph (DP204) was soluble up to 4% w/w. On the other hand, no significant solubility difference was observed in the other NH$_2$NH$_2$/salt system, but the dissolution rate increased when cellulose III was used or cellulose I was immersed in neat hydrazine prior to the addition of salt to the solution.

III.B. Example 2
Hydrazine Hydrate/Thiocyanate Salt System

The handling of hydrazine hydrate requires fewer safety precautions in handling and provides a lower cost for use of in spinning, as compared to anhydrous hydrazine. Clarification of the dissolution mechanism and the influence of water on cellulose dissolving are also of interest from the point of view of scientific research and industrial application. This Example investigated the solubility of sodium thiocyanate in hydrazine monohydrate and its dissolution power for cellulose.

Experimental. Sodium thiocyanate was dried at 110° C. overnight in a vacuum oven prior to use. Hydrazine monohydrate was obtained from Aldrich Chemical Company, St. Louis, Mo., United States of America, and used without any treatment. Cellulose I obtained from Whatman Bio Systems, Cellulose Powder CC41 with DP210 (M$_w$ 34,000), was dried at 60° C. in a vacuum oven overnight and stored in a desiccator until its use.

In a 100 mL three-necked flask equipped with a thermometer, magnetic stirrer-tip, connector to a nitrogen gas cylinder, and a dropping funnel, NaSCN (10.0 g, 0.123 mol) was put under nitrogen. The flask was kept at 25° C. in a temperature-keeping bath. Hydrazine monohydrate was added dropwise on the NaSCN with stirring through the dropping funnel. Solubility of NaSCN in hydrazine monohydrate was taken at the point of complete disappearance of NaSCN crystal in the solution.

Cellulose powders (0.50 g and 1.00 g) were placed in a polyethylene zip-lock bag (15 cm×10 cm), respectively. Ten grams of the hydrazine monohydrate saturated sodium thiocyanate was added in both bags with a Pasteur pipette. After removing air from the bags, the mixtures were subjected to shearing with a wooden roller. The bags were stored at room temperature for 2–3 days with occasional shearing. Solubility of cellulose in the system was judged from visual observation and viscosity increment of the solution.

Results And Discussion. First, solubility of sodium thiocyanate in hydrazine monohydrate was measured. The solubility was 192.0 g in 100 g of hydrazine monohydrate at 25° C. It is converted to 1.186 mol/mol (NH$_2$NH$_2$ΣH$_2$O). Solubility data of NaSCN at 25° C. in some organic or inorganic liquids are described in Table 4 below. Comparing to the solubility in other lower amines, it is about twice that in anhydrous hydrazine and similar to that in ammonia. There appears to be no relationship between the solubility of NaSCN and contents of water and amino group.

TABLE 4

Solubility of NaSCN in Some Solvents at 25° C.

| Solvent | Solubility of NaSCN* |
| --- | --- |
| NH$_3$ | 205.5 g |
| NH$_2$NH$_2$ | 91.4 g |
| NH$_2$CH$_2$CH$_2$NH$_2$ | 93.5 g |
| (CH$_3$CH$_2$)$_3$N | 137.1 g |
| NH$_2$NH$_2$ΣH$_2$O | 192.0 g |
| H$_2$O | 142.6 9 |

*Per 100 g of solvent

Next, solubility of cellulose in the NH$_2$NH$_2$ΣH2O saturated NaSCN was examined. Cellulose powders (0.50 g and 1.00 g, DP210) were respectively dispersed in each polyethylene zip-lock bag with 10 g of the NH$_2$NH$_2$ΣH$_2$O/NaSCN. The bags were stored at room temperature for 2–3 days with occasional shearing. Both cellulose solutions were obtained, and insoluble parts were not observed by visual observation. In the background art NH$_3$/NH$_4$SCN system as cellulose solvent, small amount of water up to about 15 w/w % of cellulose did not affect solubility, but a large amount of water diminished the cellulose solubility. A water molecule, rather than cellulose, is likely to link up strongly with the salt-solvent complex, which suggests that water plays a role in the dissolution of cellulose in anhydrous NH$_2$NH$_2$/NaSCN. Namely, water would retard the association of cellulose with cellulose-solvent complex. However, in the NH$_2$NH$_2$$u$H$_2$O/NaSCN system of the present invention, water is held at at least 340% and 680% w/w of cellulose in the 10% w/w and 5% w/w cellulose solution, respectively.

The solution of cellulose 5% w/w was clear and fluid liquid. A 10% w/w solution gelled after 1 week's storage at room temperature. In the cellulose/NaSCN/anhydrous NH$_2$NH$_2$ (Example 1), gelation did not occur at any concentration of cellulose over 20° C., even after a lengthy storage period. Compared to the cellulose/NaSCN/anhydrous NH$_2$NH$_2$ system, viscosity of the cellulose/NaSCN/NH$_2$NH$_2$ΣH$_2$O was higher at the same concentration.

The viscosity of NaSCN/NH$_2$NH$_2$ΣH$_2$O solvent itself is similar to that of NaSCN/NH$_2$NH$_2$ solvent (Example 1). Although it is not applicants' desire to be bound by a particulary theory of operation, gelation is attributed to the formation of physical cross-linking of cellulose chains and it is probable that more entanglement of cellulose is formed in the NaSCN/NH$_2$NH$_2$ΣH$_2$O than that in the NaSCN/NH$_2$NH$_2$. This can be confirmed by viscoelastic measurement of the solution.

III.C. Example 3
Ethylenediamine/Thiocyanate Salt System

In this Example, the substitution of hydrazine to another amine, ethylenediamine, in the amine/thiocyanate solvent system was investigated.

Experimental. All chemicals used are ACS reagent grade. Sodium thiocyanate was dried at 110° C. overnight in a vacuum oven prior to use. Anhydrous ethylenediamine was used directly without further purification. Cellulose obtained from Whatman Bio Systems, Cellulose Powder CC41 with DP210 (M$_w$ 34,000) and I polymorph, was dried at 60° C. in a vacuum oven for 1 day and stored in a desiccator until its use.

In a 100 mL three-necked flask equipped with a magnetic stirrer-tip, connector to a nitrogen gas cylinder, and dropping funnel, NaSCN (9.35 g, 0.0123 mol) was dissolved in ethylenediamine (10 g, 0.166 mol) at room temperature under nitrogen atmosphere.

Cellulose powder (1.00 g) was placed in a polyethylene zip-lock bag (15 cm×10 cm). Ten grams of the solvent saturated salt was added in the bag with a Pasteur pipette. After removing air from the bag, the mixture was subjected to shearing with a wooden rod. The bag was kept at room temperature for 1 day, with occasional shearing.

Results And Discussion. Although the $NH_2NH_2$/NaSCN is excellent solvent system for cellulose, precautions to address slight toxicity and hazard under elevated temperature (~100° C.) and pressure should be employed. The substitution of ethylenediamine was thus explored. The background art combination of ammonia and NaSCN cannot be used as solvent at ordinary conditions because of low boiling point even though it dissolves cellulose well. Ammonium thiocyanate might cause solvolysis in ethylenediamine and is thus preferably avoided in this embodiment of the solvent system of the present invention.

Solubility data of salts in ethylenediamine and some other amines at 25° C. were reported by Isbin et al. (H. S. Isbin and K. A. Kobe (1945), *J. Am. Chem. Soc.* 67:464–465). The solubility of NaSCN is 93.5 g/100 g ethylenediamine, 205.5 g/100 g $NH_3$ and 142.6 g/100$H_2O$. These values are very high compared to the other common salts. Although it is not applicants' desire to be bound by a particular theory of operation, this seems to suggest the formation of undissociated salt-solvent complex at the region of high salt concentration.

A solvent composition comprising ethylenediamine/NaSCN at a ratio of 48%/52% w/w dissolved cellulose to give a 10% w/w solution. This concentration of cellulose would not be a maximum. Interestingly, the dissolution rate was higher than that in the $NH_2NH_2$/NaSCN system. No temperature cycling was required for complete dissolution, which was required in the dissolution of cellulose in the background art $NH_3$/$NH_4SCN$ system. Although it is not applicants' desire to be bound by a particular theory of operation, considering the swelling power of ethylendiamine for cellulose, this result, now that it is in hand, is reasonable. Gel phase was not observed in the solution at room temperature after 1 day's storage.

References

The references listed below as well as all references cited in the specification are incorporated herein by reference to the extent that they supplement, explain, provide a background for, or teach methodology, techniques and/or compositions employed herein.

Aminuddin, N. MS Thesis, Department of Textile Engineering, Chemistry, and Science, North Carolina State University, Raleigh, N.C., 1993; Chapter 3, pp 38–40.

ASTM Method D1795, Annual Book of ASTM Standards; American Society for Testing and Materials: Philadelphia, 1999.

ASTM Method D4243, In Annual Book of ASTM Standards; American Society for Testing and Materials: Philadelphia, 1999.

Audrieth, L. F.; Ogg, B. A. In The Chemistry of Hydrazine, John Wiley & Sons, New York, 1951; Chapter 8 and 10, pp 167–180 and 197–208.

Blackwell, J.; Lee, D. M.; Kurz, D.; Su, M.-Y. In Cellulose—Structure, Modification and Hydrolysis, Young, R. A.; Rowell, R. M., Eds.; Wiley Interscience: New York, 1986, Chapter 3, pp 51–66.

Braunstein, J. Inorg Chim Acta Rev 1968, 2, 19–24.

Chanzy, H.; Peguy, A. J Polym Sci: Polym Phys Ed 1980,18,1137–1144.

Chanzy, H.; Dubé, M.; Marchessault, R. H. J Polym Sci: Polym Lett Ed 1979, 17, 219–226.

Chen, Y.-S.; Cuculo, J. A. J Polym Sci Part A: Polym Chem 1986, 24, 2075–2084.

Cuculo, J. A.; Aminuddin, N.; Hudson, S. M.; Wilson, A. V. In Polymeric Materials Encyclopedia; Salamone, J. C., Ed.; CRC Press: New York, 1996; Vol. 2, pp 1029–1035.

Cuculo, J. A.; Smith, C. B.; Sangwatanaroj, U.; Stejskal, E. O.; Sankar, S. S. J Polym Sci Part A: Polym Chem 1994, 32, 241–247.

Cuculo, J. A.; Smith, C. B.; Sangwatanaroj, U.; Stejskal, E. O.; Sankar, S. S. J Polym Sci Part A: Polym Chem 1994, 32, 229–239.

deBruyn, L. RecTravChim 1896,15,174–184.

DeGroot, A. W.; Guinnup, D. E.; Theil, M. H.; Cuculo, J. A. J Polym Sci Part B: Polym Phys 1991, 29, 557–563.

Dubose, A. Bull Soc Ind Rouen 1905, 33, 318–321.

Frey, M. W.; Cuculo, J. A.; Khan, S. A. J Polym Sci Part B: Polym Phys 1996, 34, 2375–2381.

Frey, M. W.; Cuculo, J. A.; Spontak, R. J. J Polym Sci Part B: Polym Phys 1996, 34, 2049–2058.

Gilbert, R. D.; Patton, P. A. Prog Polym Sci 1983, 9,115–131.

Guo, J.-X.; Gray, D. G. In Cellulosic Polymers, Blends and Composites; Gilbert, R. D., Ed.; Hanser: Munich, Vienna, New York, 1994; Chapter 2, pp 25–45.

Harrison, M. A.; Morgan, P. H.; Parks, G. S. Br Polym J 1971, 3,154.

Hudson, S. M. PhD Dissertation, Fiber and Polymer Science School of Textiles, North Carolina State University, Raleigh, N.C., 1981.

Hudson, S. M.; Cuculo, J. A. J Macromol Sci-Rev Macromol Chem 1980, C18 (1), 1–82.

Hudson, S. M.; Cuculo, J. A.; Wadsworth, L. C. J Polym Sci: Polym Chem Ed 1983, 21, 651–670.

Hunt, H. J Am Chem Soc 1932, 54, 3509.

Lee, D. M.; Blackwell, J. J Polym Sci: Polym Phys Ed 1981,19, 459–465.

Lemley, A. T.; Lagowski, J. J. J Phy Chem 1974, 78, 708–713.

Litt, M. H.; Kumar, N. G. U.S. Pat. No. 4,028,132 1977.

McCormick, C. L; Callais, P. A.; Hutchinson, Jr., B. H. Macromolecules 1985, 18, 2394–2401.

Myasoedova, V. V., In Physical Chemistry of Nonaqueous Solutions of Cellulose and Its Derivatives; Myasoedova, V. V., Ed.; Wiley: Chichester, 2000; Chapter 1, pp 3–36.

Nelson, M. L.; O'Connor, R. T. J Apply Polym Sci 1964, 8,1325–1341.

Nevell, T. P. In Cellulose Chemistry and Its Applications; Nevell, T. P.; Zeronian, S. H, Eds.; Ellis Horwood Limited: Chichester, 1985; Chapter 9, pp 223–242.

Philipp, B. J Macromol Sci-Pure and Apply Chem 1993, A30, 703–714.

Potthast, A.; Rosenau, T.; Kosma, P.; Chen, C.-L.; Gratzl, J. S. Holzforschung 2000, 54,101–103.

Scherer, P. C. J Am Chem Soc 1953, 53, 4009–4013.

Trogus, C.; Hess, K. Z Phys Chem 1931, B14, 387–395.

Vittal, J. P.; Anantasubramaniam, C. R.; Soundararajan, R.; Patil, K. C. Talanta 1979, 26, 1041–1042.

Williams, H. E., J Soc Chem Ind 1921, 40, 221 T-224T.

Williams, H. E., Mem Proc Manchester Lit Phil Soc 1921, 65, 1–14.

Yang, K.-S.; Cuculo, J. A.; Theil, M. H. J Polym Sci Part B: Polym Phys 1992, 30, 315–324.

It will be understood that various details of the invention can be changed without departing from the scope of the invention. Furthermore, the foregoing description is for the purpose of illustration only, and not for the purpose of limitation—the invention being defined by the claims appended hereto.

What is claimed is:

1. A solvent composition for cellulose, the solvent composition comprising:
    (a) an amine-based composition selected from the group consisting of hydrazine, hydrazine hydrate, and ethylenediamine; and
    (b) a salt present in an amount ranging from about 40 to about 80 wt %, wherein the salt is selected from the group consisting of a thiocyanate salt, a halide salt, and a nitrate salt.

2. The solvent composition of claim 1, wherein the amine-based composition is present in an amount ranging from about 20 to about 60 wt %.

3. A method of making a solvent composition for cellulose, the method comprising mixing the following:
    (a) an amine-based composition selected from the group consisting of hydrazine, hydrazine hydrate, and ethylenediamine; and
    (b) a salt present in an amount ranging from about 40 to about 80 wt %, wherein the salt is selected from the group consisting of a thiocyanate salt, a halide salt, and a nitrate salt.

4. The method of claim 3, wherein the amine-based composition is present in an amount ranging from about 20 to about 60 wt %.

5. A cellulose composition comprising cellulose dissolved in a solvent, the solvent comprising:
    (a) an amine-based composition selected from the group consisting of hydrazine, hydrazine hydrate, and ethylenediamine; and
    (b) a salt present in an amount ranging from about 40 to about 80 wt %, wherein the salt is selected from the group consisting of a thiocyanate salt, a halide salt, and a nitrate salt.

6. The cellulose composition of claim 5, wherein the amine composition is present in an amount ranging from about 20 to about 60 wt %.

7. The cellulose composition of claim 5, wherein up to 20 w/w % of cellulose is dissolved in the solvent.

8. The cellulose composition of claim 7, wherein about 1 to about 15 w/w % cellulose is dissolved in the solvent.

9. The cellulose composition of claim 5, further defined as anisotropic.

10. The cellulose composition of claim 5, wherein the cellulose is cellulose I.

11. A method for forming a cellulose composition, the method comprising dissolving cellulose in a solution comprising:
    (a) an amine-based composition selected from the group consisting of hydrazine, hydrazine hydrate, and ethylenediamine; and
    (b) a salt present in an amount ranging from about 40 to about 80 wt %, wherein the salt is selected from the group consisting of a thiocyanate salt, a halide salt, and a nitrate salt.

12. The method of claim 11, wherein the amine-based composition is present in an amount ranging from about 20 to about 60 wt %.

13. The method for forming a cellulose composition of claim 11, wherein up to about 20 w/w % of cellulose is dissolved in the solvent.

14. The method for forming a cellulose composition of claim 13, wherein about 1 to about 15 w/w % cellulose is dissolved in said solvent.

15. The method for forming a cellulose composition of claim 11, wherein the cellulose composition comprises an anisotropic phase.

16. A method of forming a cellulose article, the method comprising:
    (a) dissolving cellulose in a solvent comprising:
        (i) an amine-based composition selected from the group consisting of hydrazine, hydrazine hydrate, and ethylenediamine; and
        (ii) a salt present in an amount ranging from about 40 to about 80 wt %, wherein the salt is selected from the group consisting of a thiocyanate salt, a halide salt, and a nitrate salt; and
    (b) forming a cellulose article from a cellulose composition of step (a).

17. The method of claim 16, wherein the amine-based composition is present in an amount ranging from about 20 to about 60 wt %.

18. The method of claim 16, wherein up to about 20 w/w % of cellulose is dissolved in said solvent.

19. The method of claim 18, wherein about 1 to about 15 w/w % cellulose is dissolved in said solvent.

20. The method of claim 16, wherein the cellulose composition comprises an anisotropic phase.

21. The method of claim 16, wherein the article is a cellulose fiber or a cellulose film.

22. The method of claim 21, wherein the cellulose fiber is prepared by wet spinning.

23. A cellulose fiber formed by the method of claim 22.

24. The method of claim 21, wherein the cellulose film is formed by extruding a film of the cellulose composition into a coagulation bath.

25. A cellulose film formed by the method of claim 24.

26. A cellulose article formed by the method of claim 16.

27. A cellulose article formed from a cellulose composition comprising cellulose dissolved in a solvent comprising:
    (a) an amine-based composition selected from the group consisting of hydrazine, hydrazine hydrate, and ethylenediamine; and
    (b) a salt present in an amount ranging from about 40 to about 80 wt %, wherein the salt is selected from the group consisting of a thiocyanate salt, a halide salt, and a nitrate salt.

28. The cellulose article of claim 27, wherein the article is a cellulose fiber.

29. The cellulose article of claim 27, wherein the article is a cellulose film.

30. The cellulose article of claim 27, wherein the amine-based composition is present in an amount ranging from about 20 to about 60 wt %.

31. The cellulose article of claim 27, wherein up to about 20 w/w % of cellulose is dissolved in said solvent.

32. The cellulose article of claim 31, wherein about 1 to about 15 w/w % cellulose is dissolved in the solvent.

33. The cellulose article of claim 27, wherein the cellulose composition comprises an anisotropic phase.

* * * * *